(12) United States Patent
Fujikata et al.

(10) Patent No.: US 9,244,295 B2
(45) Date of Patent: Jan. 26, 2016

(54) OPTICAL MODULATOR AND OPTICAL MODULATION DEVICE WITH ZIGZAG ELECTRODE AND WAVEGUIDE ARM ALIGNMENT

(71) Applicant: NEC Corporation, Minato-ku, Tokyo (JP)

(72) Inventors: Junichi Fujikata, Tokyo (JP); Shigeki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/665,118

(22) Filed: Mar. 23, 2015

(65) Prior Publication Data

US 2015/0277159 A1    Oct. 1, 2015

(30) Foreign Application Priority Data

Mar. 27, 2014    (JP) .................................. 2014-067114

(51) Int. Cl.
*G02F 1/025* (2006.01)

(52) U.S. Cl.
CPC ..................................... *G02F 1/025* (2013.01)

(58) Field of Classification Search
None
See application file for complete search history.

(56) References Cited

U.S. PATENT DOCUMENTS

| | | | | |
|---|---|---|---|---|
| 4,683,448 A * | 7/1987 | Duchet | .................... | G02F 1/225 367/131 |
| 6,298,177 B1 * | 10/2001 | House | .................... | G02F 1/025 385/3 |
| 6,374,001 B1 * | 4/2002 | Bozeat | .................... | G02F 1/025 385/131 |
| 6,654,398 B2 * | 11/2003 | Cho | .................... | H01S 5/06203 372/46.01 |
| 8,936,962 B2 * | 1/2015 | Fujikata | .................. | G02F 1/025 438/79 |
| 8,989,522 B2 * | 3/2015 | Qian | ..................... | H01L 31/105 385/14 |
| 2004/0208454 A1 * | 10/2004 | Montgomery | ........ | G02F 1/2257 385/50 |
| 2006/0285193 A1 * | 12/2006 | Kimura | .............. | G02B 26/0841 359/291 |
| 2008/0316570 A1 * | 12/2008 | Park | ......................... | G01K 7/16 359/237 |
| 2012/0003767 A1 | 1/2012 | Fujikata et al. | | |
| 2012/0099813 A1 * | 4/2012 | Lee | .......................... | G02F 1/025 385/3 |
| 2014/0116983 A1 * | 5/2014 | Kitamura | .............. | G02F 1/2257 216/13 |

FOREIGN PATENT DOCUMENTS

| | | |
|---|---|---|
| JP | 06-082732 A | 3/1994 |
| JP | 2002-062516 A | 2/2002 |
| JP | 2006-065085 A | 3/2006 |
| JP | 2006-515082 A | 5/2006 |
| JP | 2013-020149 A | 1/2013 |
| WO | 2010/103891 A1 | 9/2010 |

* cited by examiner

*Primary Examiner* — Andrew Jordan

(57) ABSTRACT

An optical modulator includes a plurality of electrode pads arranged in a zigzag alignment; two arms which are partially bent to circumvent the electrode pads so as to carry out optical phase modulation at various parts based on voltages input via the electrode pads; an optical branch structure branching the arms; and an optical coupling structure aggregating the arms together. Each arm is made of a silicon-base electro-optic element including a substrate; a first conductive semiconductor layer having a rib waveguide structure; a dielectric layer deposited on the rib waveguide structure; and a second conductive semiconductor layer deposited on the dielectric layer. The first conductive semiconductor layer is connected to first electrode wires via first contacts, while the second conductive semiconductor layer is connected to second electrode wires via second contacts. Thus, it is possible to miniaturize the optical modulator which can operate at a low voltage.

9 Claims, 8 Drawing Sheets

OPTICAL MODULATOR AND OPTICAL MODULATION DEVICE WITH ZIGZAG ELECTRODE AND WAVEGUIDE ARM ALIGNMENT

BACKGROUND OF THE INVENTION

1. Field of the Invention

The present invention relates to an optical modulator and an optical modulation device.

The present application claims priority on Japanese Patent Application No. 2014-67114, the entire content of which is incorporated herein by reference.

2. Description of the Related Art

Optical communication devices operating with wavelengths ranging from 1,310 nm to 1,550 nm have been used for local area networks (LANs) and optical fibers used for household appliances. It is preferable to employ silicon-base optical communication devices in which optical function devices and electronic circuits can be integrated on silicon platforms by way of CMOS technologies.

Silicon-base optical communication devices have been developed and applied to waveguides, optical couplers, wavelength filters, optical modulators, etc. Among them, optical modulators serving as active devices have attracted attention among engineers. Additionally, it is generally known that Mach-Zehnder interferometers can be applied to optical modulators using changes of refractive indexes. Optical modulators using Mach-Zehnder interferometers are designed to produce optical intensity modulation signals by way of interference on differences of optical phases in arms including two optical waveguides.

Various types of optical devices and optical modulators have been developed and disclosed in various documents. Patent Literature Document 1 discloses a soliton pulse generating device using a Y-junction Mach-Zehnder interferometer. Patent Literature Document 2 discloses an electro-optic SSB optical modulator having a period domain inverting structure using a Mach-Zehnder interferometer waveguide. Patent Literature Document 3 discloses a semiconductor Mach-Zehnder optical modulator. Patent Literature Document 4 discloses a high-speed silicon-base electro-optic modulator. Patent Literature Document 5 discloses an optical device including an optical demultiplexer, a Mach-Zehnder optical modulator, and an optical multiplexer. Patent Literature Document 6 discloses an optical modulator.

FIG. 11 is a schematic illustration showing an example of an optical modulator using a Mach-Zehnder interferometer. The optical modulator includes a first arm A1 and a second arm A2, which are connected to an optical branch structure A3 and an optical coupling structure A4. The optical branch structure A3 is branched into the arms A1 and A2 in the light-input side while the optical coupling structure A4 couples the arms A1 and A2 together in the light-output side. Light input to the optical branch structure A3 is changed in phase while being guided along the arms A1 and A2. Then, optical signals transmitted through the arms A1 and A2 are combined together via the optical coupling structure A4. Both the arms A1 and A2 are silicon-base electro-optic elements which operate based on voltages so that light is changed in phase due to an electro-optic effect or a thermo-optic effect.

Both the arms A1 and A2 have the same length. Without any voltages, no phase differences occur between the arms A1 and A2 so as to superimpose optical signals having the same wavelength, thus maximizing the intensity of light output from the optical coupling structure A4. With a phase difference $\pi$ occurring between the arms A1 and A2, optical signals transmitted through the arms A1 and A2 are cancelled out when combined together via the optical coupling structure A4, thus minimizing the intensity of light output from the optical coupling structure A4.

Generally speaking, it is possible to maximize an extinction ratio of light by setting an operating point to the intensity of light output from an optical modulator applied with an intermediate voltage between the maximum voltage maximizing the intensity of light and the minimum voltage minimizing the intensity of light. Any one of arms is set to an initial state applied with a voltage causing an optical phase difference corresponding to a half wavelength, and then an operating point (or a reference point) is set to the intensity of light in the initial state. An optical modulator operates based on an operating point so as to output an optical signal.

An optical phase difference occurs between two arms when a voltage is applied to at least one of two arms. For example, two arms are configured of silicon-base electro-optic elements in which refractive indexes are changed in optical waveguides due to an electro-optic effect or a thermo-optic effect upon applied voltages. Changes of refractive indexes in optical waveguides may cause changes of optical waveguide conductions, thus causing an optical phase difference between two arms having the same length.

A voltage causing an optical phase difference may occur due to an operating voltage of a power source applied to electrode pads of an optical modulator. Herein, a power source is connected to electrode pads via a circuit substrate mounting electrode pads so that electrode pads of a circuit substrate can join electrode pads of an optical modulator.

It is preferable to further develop optical modulators which are reduced in size and which can operate based on a low operating voltage. Patent Literature Document 3 teaches an optical modulator which can operate based on a low operating voltage by dividing electrode pads. Patent Literature Document 4 teaches a silicon-base electro-optic modulator in which a dielectric layer is interposed between a first conductive semiconductor layer and a second conductive semiconductor layer, achieving a PIN diode structure. This aims to improve the response speed while reducing the size of an optical modulator.

As described above, it is possible to achieve an optical modulator operating based on a low operating voltage by dividing an electrode pad into a plurality of electrode pads or by reducing the size of an optical modulator. However, these techniques require that electrode pads of an optical modulator be attached to electrode pads of a drive circuit at a high precision. For this reason, it is impossible to achieve a highly-integrated optical modulator.

Specifically, an optical modulator of Patent Literature Document 3 is designed to juxtapose electrode pads in parallel, and therefore it is necessary to set an electrode interval between adjacent electrodes to be larger than a bonding error. This makes it difficult to realize a highly-integrated optical modulator. Additionally, a silicon-base electro-optic modulator of Patent Literature Document 4 includes a very thin area of about 10 nm causing dynamic changes of a carrier density. This technology needs an optical phase modulation length on the order of millimeters, which makes it difficult to reduce the size of an optical modulator. Since this technology inevitably increases the size of an optical modulator, it is impossible to achieve a highly-integrated optical modulator.

CITATION LIST

Patent Literature Document

Patent Literature Document 1: Japanese Patent Application Publication No. H06-82732
Patent Literature Document 2: Japanese Patent Application Publication No. 2002-62516
Patent Literature Document 3: Japanese Patent Application Publication No. 2006-65085
Patent Literature Document 4: Japanese Patent Application Publication No. 2006-515082
Patent Literature Document 5: Japanese Patent Application Publication No. 2013-20149
Patent Literature Document 6: WO 2010/103891A1

SUMMARY OF THE INVENTION

It is an object of the present invention to provide a highly-integrated optical modulator and an optical modulation device having a reduced size.

In a first aspect, the present invention is directed to an optical modulator including a plurality of electrode pads arranged in a zigzag alignment; a pair of arms, each of which is partially bent to circumvent the plurality of electrode pads and each of which carries out optical phase modulation at a plurality of optical modulation parts based on voltages input via a plurality of electrode pads; an optical branch structure in which a pair of arms is branched away in a light-input side; and an optical coupling structure in which a pair of arms is aggregated together in a light-output side.

In a second aspect, the present invention is directed to an optical modulation device including the above optical modulator; a drive circuit connected to a plurality of electrode pads included in the optical modulator; and a power source connected to the drive circuit.

According to the present invention, it is possible to achieve an optical modulator which can be miniaturized in size and which can operate with low power consumption. Additionally, it is possible to achieve an optical modulation device including high integration of optical modulators.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

Figure 1:
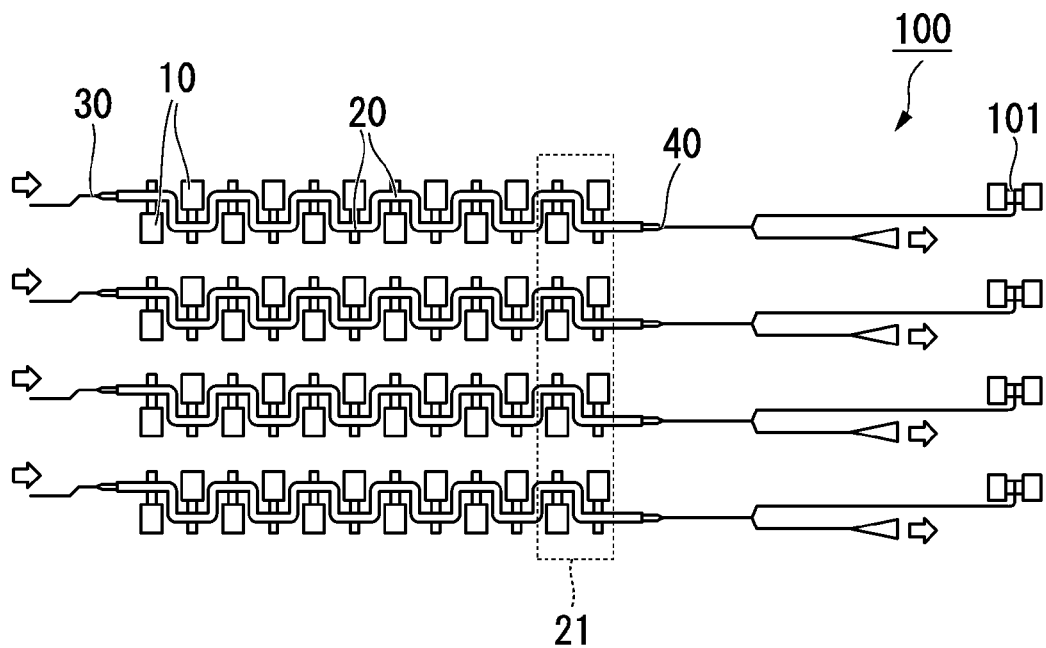
FIG. 1 is a schematic illustration of an optical modulator according to one embodiment of the present invention.
Figure 2:
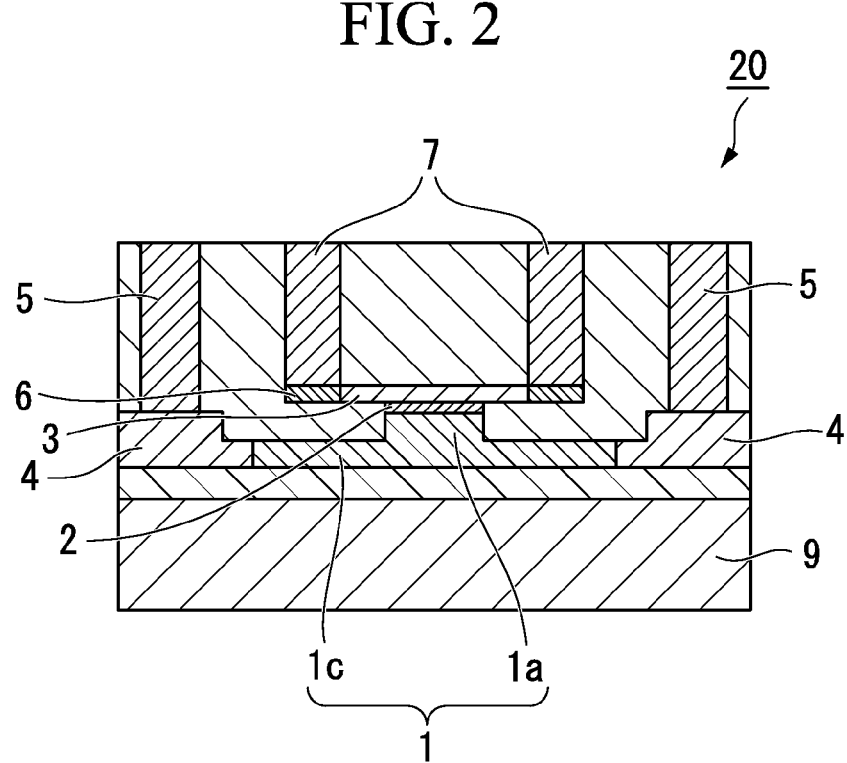
FIG. 2 is a cross-sectional view of a silicon-base electro-optic element forming each of two arms in an optical modulator.

FIG. 1 is a schematic illustration of an optical modulator 100 according to one embodiment of the present invention. FIG. 2 is a cross-sectional view of a silicon-base electro-optic element forming each of two arms in the optical modulator 100.

The optical modulator 100 includes a plurality of electrode pads 10 in a zigzag alignment, two arms 20, an optical branch structure 30 branching two arms 20 in the light-input side, and an optical coupling structure 40 aggregating two arms 20 in the light-output side. Two arms 20 are each bent and folded to circumvent the electrode pads 10. Additionally, two arms 20 are each configured to carry out optical phase modulation at multiple points.

Two arms 20 are made of silicon-base electro-optic elements as shown in FIG. 2. The silicon-base electro-optic element includes a substrate 9, a first conductive semiconductor layer 1 further including a rib waveguide structure 1a having a rectangular shape projecting oppositely to the substrate 9, a dielectric layer 2 deposited on the rib waveguide structure 1a, and a second conductive semiconductor layer 3 deposited on the dielectric layer 2. The first conductive semiconductor layer 1 is connected to a first electrode wire 5 via a first contact 4 doped with first conductive impurities at a higher density than other parts. The second conductive semiconductor layer 3 is connected to a second electrode wire 7 via a second contact 6 doped with second conductive impurities at a higher density than other parts. The first contact 4 has a rectangular shape projecting above a slab 1c of the first conductive semiconductor layer 1. The slab 1c indicates a non-projected part of the first conductive semiconductor layer 1.

A power source connected to electrode pads 10 supplies a voltage via the first electrode wire 5 and the second electrode wire 7 in the silicon-base electro-optic element. A voltage applied to the silicon-base electro-optic element may change the refractive index of an optical waveguide due to carrier injection or depletion occurring in the boundary between the first conductive semiconductor layer 1 and the second conductive semiconductor layer 3. Herein, an optical waveguide is formed using the first conductive semiconductor layer 1 (particularly, the rib waveguide structure 1a), the dielectric layer 2, and the second conductive semiconductor layer 3.

As shown in FIG. 1, the optical modulator 100 includes a plurality of electrode pads 10 in a zigzag alignment, two arms 20 which are bent to circumvent the electrode pads 10 and which are each configured to carry out optical phase modulation at multiple points due to a voltage given by each electrode 10, an optical branch structure 30 branching two arms 20 in the light-input side, and an optical coupling structure 40 aggregating two arms 20 in the light-output side. The optical modulator 100 divides an output signal into two signals, i.e. a first signal output to an external device (not shown) and a second signal which is detected with a photo diode 101 (used to monitor the output signal) so as to measure an operating point which may be shifted during operation. Two arms 20 may include optical modulation parts 21 configured to correct for a shift of an operating point. FIG. 1 shows that a plurality of optical modulators 100 is aligned on a substrate with a predetermined width ranging from 125 μm to 250 μm and thus integrated at a high density.

Owing to the zigzag alignment of the electrode pads 10, it is possible to produce an optical modulation device including a plurality of optical modulators 100 which are juxtaposed together and integrated at a high density on a substrate.

Figure 3A:
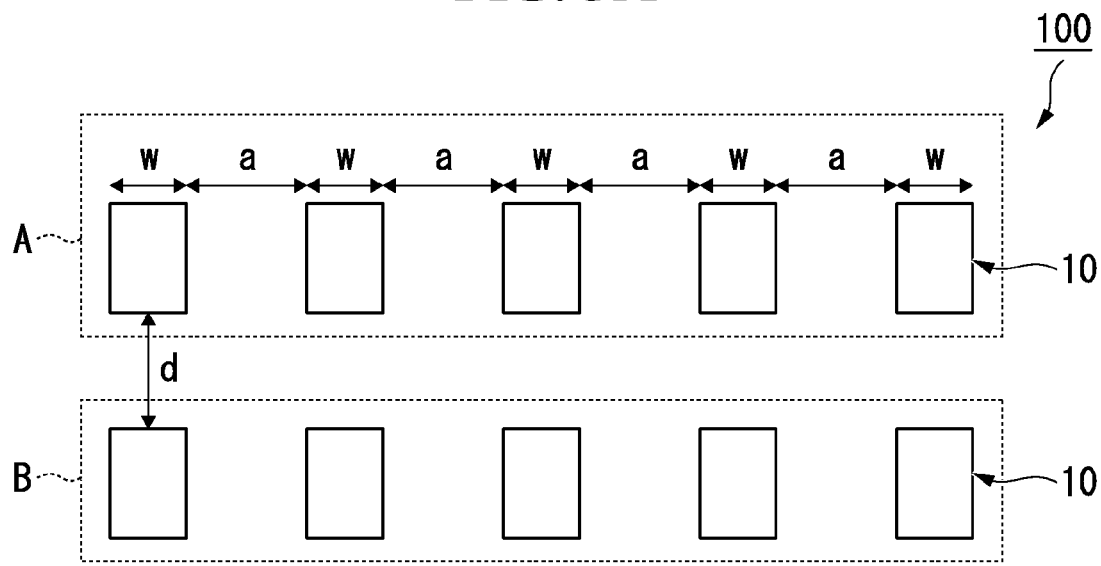
FIG. 3A is a schematic illustration showing the parallel alignment of electrode pads in an optical modulator.

When a plurality of electrode pads 10 is aligned in parallel as shown in FIG. 3A, it is necessary to separate a first optical modulator A and a second optical modulator B with a distance d which is needed to secure an adequate precision in bonding the electrode pads 10 with a drive circuit (not shown). In other words, a useless space due to the distance d may occur between the first optical modulator A and the second optical modulator B.

Figure 3B:
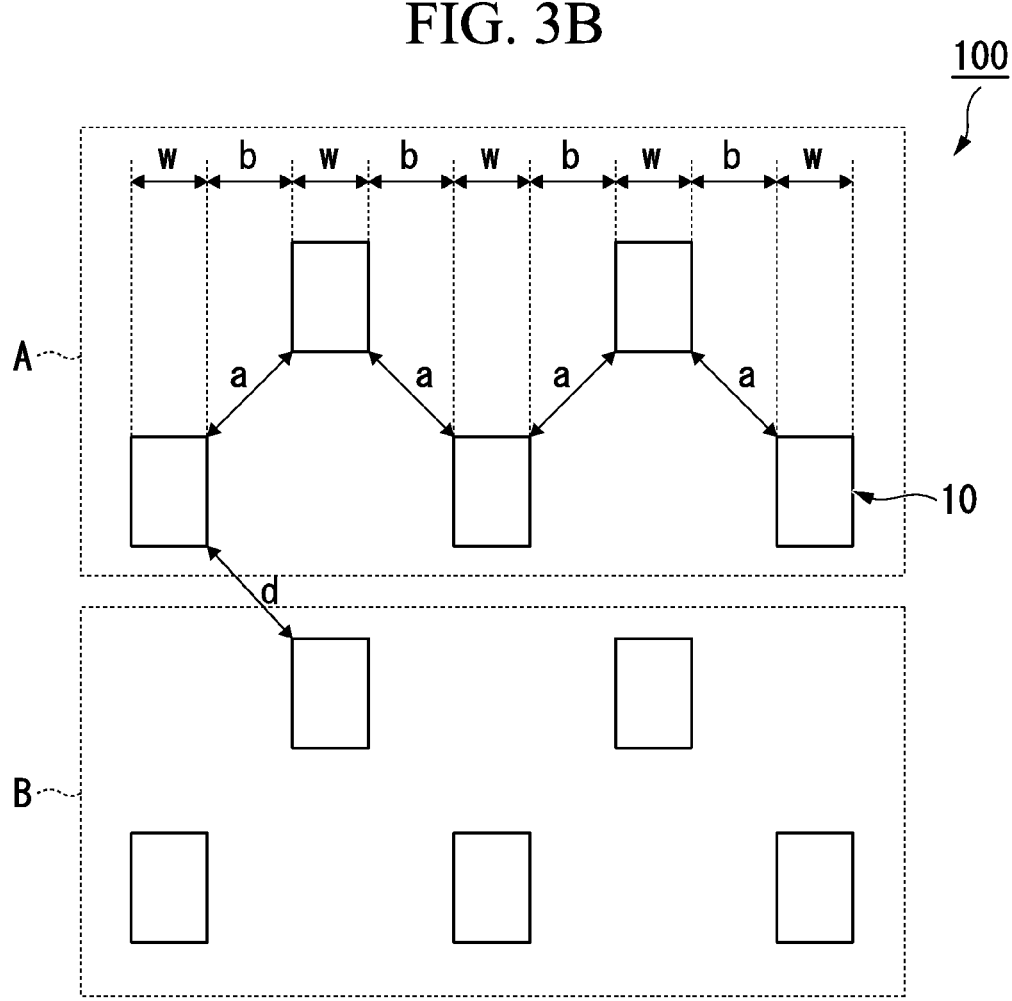
FIG. 3B is a schematic illustration showing the zigzag alignment of electrode pads in an optical modulator.

When a plurality of electrode pads 10 is arranged in a zigzag alignment as shown in FIG. 3B, it is necessary to separate the electrode pads 10 from each other with a minimum distance "a" which is needed to secure an adequate precision in bonding the electrode pads 10 with a drive circuit (not shown). In the parallel alignment of five electrode pads 10 shown in FIG. 3A, the entire length of each optical modulator 100 is "5w+4a" where "w" denotes the width of each electrode pad 10.

In the zigzag alignment of the electrode pads 10 shown in FIG. 3B, the minimum distance "a" is formed between adjacent electrode pads 10 in an oblique direction. For this reason, a distance "b" is formed between the terminal faces of adjacent electrode pads 10 (i.e. perpendicular lines drawn along the terminal faces of adjacent electrode pads 10). In the zigzag alignment of five electrode pads 10 shown in FIG. 3B, the entire length of each optical modulator 100 is "5w+4b" where "w" denotes the width of each electrode pad 10. By comparing the zigzag alignment of FIG. 3B with the parallel alignment of FIG. 3A where "a" is longer than "b", it is possible to reduce the entire length of each optical modulator 100 by way of the zigzag alignment of the electrode pads 10. Thus, it is possible to integrate a plurality of optical modulators on a substrate at a high density.

In the optical modulator 100, optical phase modulation is carried out at multiple points due to a drive voltage from each electrode pad 10. For this reason, it is possible to reduce the voltage applied to each electrode pad 10 to be lower than the voltage applied to a single electrode pad used to carry out optical phase modulation at once. That is, it is possible to drive the optical modulator 100 at a low voltage. Thus, it is possible to achieve low power consumption for the optical modulator 100.

It is preferable that two arms 20 be made of specific silicon-base electro-optic elements, which will be described below.

Silicon-base electro-optic elements utilize electro-optic effects (i.e. free carrier plasma effects). Hereinafter, the outline of an optical phase modulation mechanism, serving as an operating principle of silicon-base electro-optic elements, will be described with respect to silicon-base electro-optic elements including silicon semiconductor layers.

It is impossible or difficult to achieve an intrinsic electro-optic effect using silicon; hence, it is possible to solely utilize a free carrier plasma effect and a thermo-optic effect for optical phase modulation. The free carrier plasma effect may solely and effectively demonstrate a high-speed operation in units of Gigabits per second or more. This effect can be defined using first-order approximations according to Equations 1, 2.

$$\Delta n = -\frac{e^2\lambda^2}{8\pi^3 c^3 \varepsilon_0 n}\left(\frac{\Delta N_e}{m_e} + \frac{\Delta N_h}{m_h}\right) \quad \text{[Equation 1]}$$

$$\Delta k = -\frac{e^3\lambda^2}{8\pi^3 c^3 \varepsilon_0 n}\left(\frac{\Delta N_e}{m_e^2 \mu_e} + \frac{\Delta N_h}{m_h^2 \mu_h}\right) \quad \text{[Equation 2]}$$

In the above, Equation 1 denotes a real part of a refractive-index change in a silicon layer while Equation 2 denotes an imaginary part of a refractive-index change in a silicon layer, wherein e denotes an electric charge, λ denotes a wavelength of light, $\varepsilon_0$ denotes a dielectric constant in vacuum, n denotes a refractive index of a silicon layer, $m_e$ denotes an effective mass of an electron carrier, $m_h$ denotes an effective mass of a hole carrier, $\mu_e$ denotes mobility of an electron carrier, $\mu_h$ denotes mobility of a hole carrier, $\Delta N_e$ denotes a density change of electron carriers, and $\Delta N_h$ denotes a density change of hole carriers.

Various experimental evaluations have been carried out with respect to electro-optic effects in silicon layers, wherein it is known that Drude equations are consistent with refractive-index changes at carrier densities using wavelengths of 1,310 nm to 1,550 nm used for optical communications. In electro-optic elements using this theory, it is possible to define a phase-change value Δθ via Equation 3.

$$\Delta\theta = \frac{2\pi}{\lambda}\Delta n_{eff} L \quad \text{[Equation 3]}$$

In Equation 3, L denotes the length of an active layer (i.e. an effective modulation region) in an optical propagation direction in a silicon-base electro-optic element while $\Delta n_{eff}$ denotes an effective refractive index which can be obtained from Δn and Δk. According to Equation 3, it is possible to produce a large phase change using a large change of an effective refractive index $\Delta n_{eff}$ irrespective of a short length L of an active layer.

As shown in FIG. 2, a silicon-base electro-optic element includes a substrate 9, a first conductive semiconductor layer 1 having a rib waveguide structure 1a having a rectangular shape projecting oppositely to the substrate 9, a dielectric layer 2 deposited on the rib waveguide structure 1a, and a second conductive semiconductor layer 3 deposited on the dielectric layer 2. The first conductive semiconductor layer 1 is connected to first electrode wires 5 via first contacts 4 doped with first conductive impurities at a higher density than other parts. The second conductive semiconductor layer 3 is connected to second electrode wires 7 via second contacts 6 doped with second conductive impurities at a higher density than other parts. Additionally, the first contact 4 has a rectangular shape projecting above a slab 1c. In FIG. 2, the silicon-base electro-optic element includes the substrate 9 serving as an SOI (Silicon On Insulator) substrate which is formed by depositing an oxide film 9b on a silicon substrate 9a; but this is not a restriction. It is possible to use any types silicon-base substrates.

The silicon-base electro-optic element has the rib waveguide structure 1a so that the optical waveguide may overlap a refractive-index changing region, which in turn increases optical modulation efficiency relative to an operating voltage of the silicon-base electro-optic element. That is, it is possible to reduce the size of an optical modulator by reducing the length of an active layer of optical modulation.

The refractive-index changing region can be regarded as a carrier-density changing region, which is proximate to the boundary between the first conductive semiconductor layer 1 and the dielectric layer 2 or the boundary between the second conductive semiconductor layer 3 and the dielectric layer 2. Owing to the formation of the rib waveguide structure 1a, it is possible to reduce the overlap between the optical waveguide and the high-density doping region.

The high-density doping region corresponds to the first contacts 4 and the second contacts 6. Light transmitted through the high-density doping region will be absorbed by dopants. Owing to the rib waveguide structure 1a, it is possible to reduce a loss due to light absorption in the high-density doping region.

The thickness W of a carrier-density changing region (i.e. the maximum thickness of a depletion layer) is given by Equation 4 under the thermal equilibrium condition.

$$W = 2\sqrt{\frac{\varepsilon_s kT \cdot \ln(N_c/n_i)}{e^2 N_c}}$$ [Equation 4]

In Equation 4, $\varepsilon_s$ denotes a dielectric constant of a semiconductor layer, k denotes a Boltzmann constant, $N_c$ denotes a carrier density, $n_i$ denotes an intrinsic carrier density, and e denotes an electric charge. When $N_c$ is $10^{17}/cm^3$, for example, the maximum thickness of a depletion layer is about 0.1 μm. An increased carrier density may reduce the thickness of a depletion layer, i.e. the thickness of a carrier-density changing region.

For this reason, it is preferable that the height of the rib waveguide structure 1a above the substrate 9 be equal to or higher than W. It is possible to confine a carrier-density changing region within the rib waveguide structure 1a having the height of W or more, thus increasing the overlap with the optical waveguide.

The first conductive semiconductor layer 1 is connected to the first electrode wires 5 via the first contacts 4 doped with first conductive impurities at a higher density than other parts. Similarly, the second conductive semiconductor layer 3 is connected to the second electrode wires 7 via the second contacts doped with second conductive impurities at a higher density than other parts. High-density doping of impurities may reduce the contact resistance in the boundary between the first conductive semiconductor layer 1 and the first electrode wire 5 and the contact resistance in the boundary between second conductive semiconductor layer 3 and the second electrode wire 7. As a result, it is possible to reduce series resistance and an RC time constant. That is, it is possible to improve the speed of optical modulation.

The first contact 4 has a rectangular shape projecting above the slab 1c of the first conductive semiconductor layer 1. This increases a doping density in the first contact 4, thus reducing the contact resistance in the boundary between a semiconductor and a conductor. That is, it is possible to increase the speed of optical modulation while reducing an RC time constant.

Owing to the first contact 4 having a rectangular shape projecting above the slab 1c, it is possible to reduce the width of the slab 1c. The slab 1c is reduced in thickness about 0.1 μm in order to reduce the overlap between the optical waveguide and the high-density doping region. However, it is difficult to form the slab 1c which is uniformly reduced in thickness in a relatively wire area.

It is preferable that the first conductive semiconductor layer 1 and the second conductive semiconductor layer 3 be formed using a single layer made of materials selected from among polycrystalline silicon, amorphous silicon, distortion silicon, monocrystalline silicon, and $Si_{1-x}Ge_x$.

The silicon-base electro-optic element having high optical modulation efficiency does not need a long length of phase modulation. Thus, it is possible to miniaturize optical modulators. In particular, the above layout and structure are needed to achieve high integration of miniaturized optical modulators.

In the silicon-base electro-optic element, it is preferable to continuously form the first contact 4 in an optical waveguide direction, but it is preferable to divide the second conductive semiconductor layer 3 in an optical waveguide direction.

Figure 4:
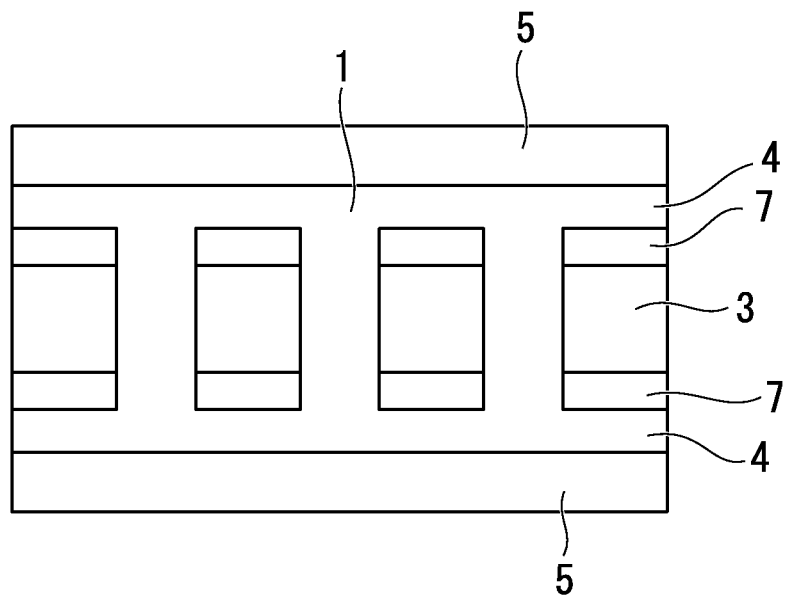
FIG. 4 is a plan view of a silicon-base electro-optic element.

FIG. 4 is a plan view of a silicon-base electro-optic element. In FIG. 4, the first contact 4 is continuously formed in the optical waveguide direction on the substrate 9 while the second conductive semiconductor layer 3 is divided into subareas. Optical modulation occurs in the boundary between the first conductive semiconductor layer 1 and the second conductive semiconductor layer 3. Thus, it is possible to divide the area causing optical modulation by dividing the second conductive semiconductor layer 3. In other words, it is possible to divide a voltage of driving a silicon-base electro-optic element, thus reducing an operating voltage of an optical modulator.

Owing to the continuous formation of the first contact 4, it is possible to commonly share a bias voltage in an optical modulator in which the area causing optical modulation is divided into subareas. Thus, it is possible to prevent the number of contact terminals from being increased in an optical modulation device including high integration of optical modulators.

Figure 5:
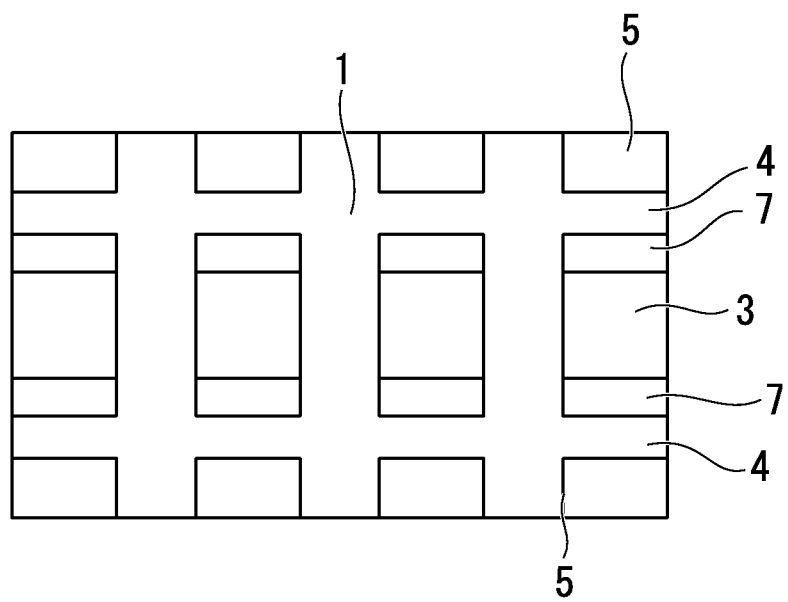
FIG. 5 is a plan view of another silicon-base electro-optic element.

In the silicon-base electro-optic element, it is preferable that the first contact 4 and the second conductive semiconductor layer 3 be divided into subareas. FIG. 5 is a plan view of another silicon-base electro-optic element. Since optical modulation occurs in the boundary between the first conductive semiconductor layer 1 and the second conductive semiconductor layer 3, it is possible to divide the area of optical modulation into subareas by dividing the second conductive semiconductor layer 3. This makes it possible to apply a voltage of driving a silicon-base electro-optic element to each of subareas, thus reducing the operating voltage of an optical modulator.

The first contact 4 is divided into subareas although the first conductive semiconductor layer 1 is formed continuously to secure the optical waveguide. Accordingly, the first electrode wires 5 are divided in connection with subdivisions of the first contact 4; hence, it is possible to electrically isolate those parts. This makes it possible to correct dispersions of performance among optical modulators while correctly shaping the output waveform.

It is preferable that two arms made of silicon-base electro-optic elements be formed adjacent to each other on the same substrate while sharing first electrode wires and first contacts in adjacent faces thereof.

Figure 6:
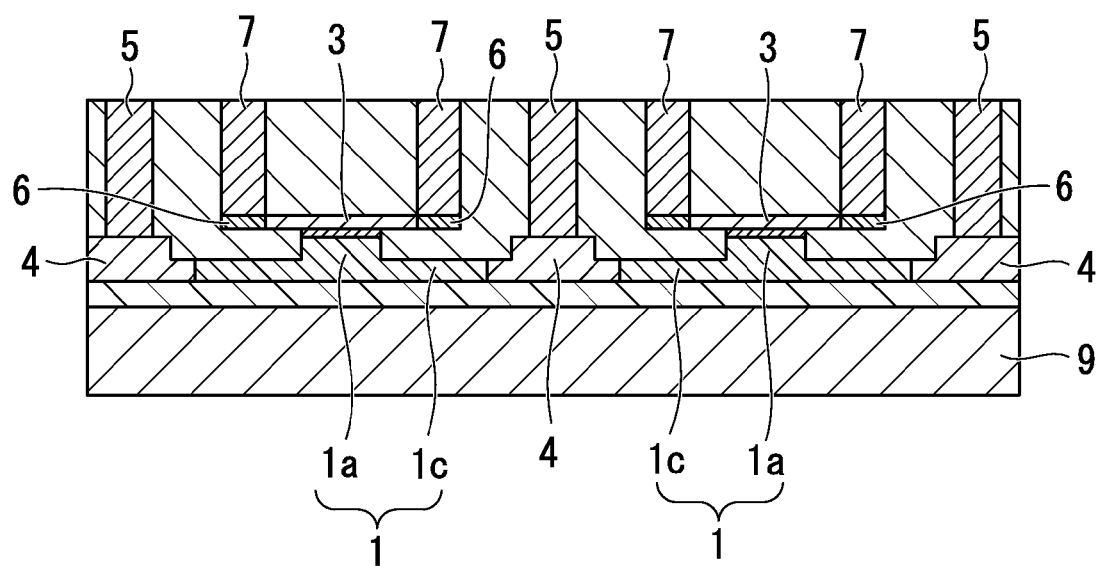
FIG. 6 is a cross-sectional view of a further silicon-base electro-optic element.

FIG. 6 is a cross-sectional view of a silicon-base electro-optic element in which two arms are connected together while sharing the first electrode wire 5 and the first contact 4. Herein, silicon materials have an optical refractive index with a thermo-optic coefficient of $1.8 \times 10^{-5}/°$ C., which is one-digit higher than the thermo-optic coefficient of a silicon oxide film used for an oxide-film clad layer. For this reason, an optical phase difference may occur between two arms due to an environmental temperature difference. It is necessary to suppress an optical phase difference due to an environmental temperature difference, causing noise.

In the silicon-base electro-optic element of FIG. 5 having a continuously formed substrate, it is possible to suppress an environmental temperature difference since two arms thermally join together. Thus, it is possible to significantly reduce an optical phase difference between two arms and a shift of an operating point due to an environmental temperature variation. In the silicon-base electro-optic element which is designed to share first electrode wires and first contacts, it is possible to reduce the size of an optical modulator.

Next, a manufacturing method of a silicon-base electro-optic element 20 will be described with reference to FIGS. 7A to 7G.

Figure 7A:
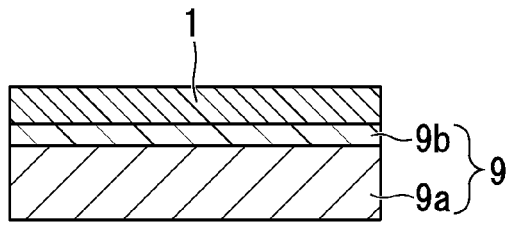
FIG. 7A is a cross-sectional view showing a first step of a manufacturing method of a silicon-base electro-optic element.

As shown in FIG. 7A, there is provided a substrate 9 including an embedded oxide film 9b having thickness of about 100 nm to 1,000 nm. The substrate 9 is an SOI substrate in which a portion close to a deposition surface, rather than the embedded oxide film 9b, exhibits p-type or n-type conductivity. The substrate 9 can be formed according to a generally-known technique. Alternatively, it is possible to purchase a substrate product sold on market.

A semiconductor layer 1 close to the deposition surface (i.e. a first conductive semiconductor layer 1) is formed on the substrate 9. Herein, it is possible to dope impurities (or inject ions) made of boron, phosphorus, arsenic, etc. into the semiconductor layer 1 before or after the manufacturing of the substrate 9.

Figure 7B:
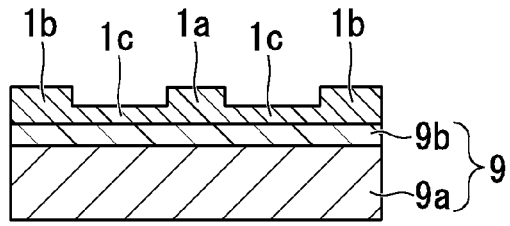
FIG. 7B is a cross-sectional view showing a second step of a manufacturing method of a silicon-base electro-optic element.

As shown in FIG. 7B, the semiconductor layer 1 is selectively etched using a photolithographic technique so as to form slabs 1c between rectangular-shaped portions 1a and 1b. Thus, it is possible to form the rectangular-shaped portion 1a serving as a rib waveguide structure and the rectangular-shaped portions 1b serving as first contacts 4, all of which are shaped to project above the slabs 1c.

In the above, it is possible to employ either wet etching or dry etching. Herein, it is necessary to adjust etching conditions so as to prevent the slabs 1c from being completely removed from the semiconductor layer 1. It is possible to adjust etching conditions by changing temperatures. It is preferable to set the thickness of the slab 1c to 50 nm to 150 nm.

Figure 7C:
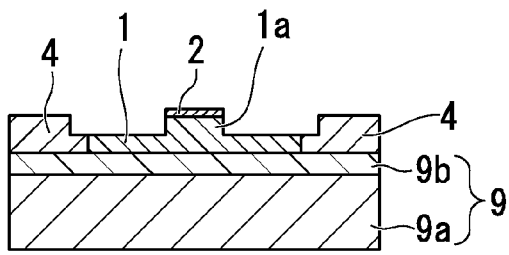
FIG. 7C is a cross-sectional view showing a third step of a manufacturing method of a silicon-base electro-optic element.

As shown in FIG. 7C, the rectangular-shaped portions 1b of the first conductive semiconductor layer 1 are doped with first conductive impurities according to an ion injection, thus forming first contacts 4. The first contacts 4 are doped with first conductive impurities at a higher density than other parts.

Subsequently, a dielectric layer 2 is deposited on the rib waveguide structure 1a having a rectangular shape projecting above the slabs 1c in the first conductive semiconductor layer 1.

Figure 7D:
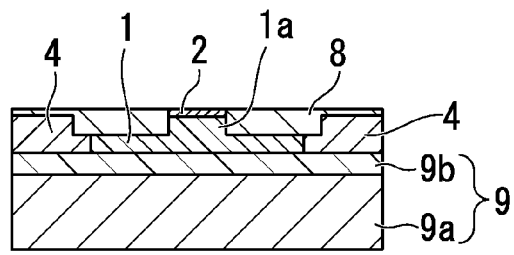
FIG. 7D is a cross-sectional view showing a fourth step of a manufacturing method of a silicon-base electro-optic element.

According to a film forming method using plasma CVD (Chemical Vapor Deposition), an oxide film clad layer 8 is temporarily formed to cover the first conductive semiconductor layer 1 and the dielectric layer 2. As shown in FIG. 7D, any projections of the oxide film clad layer 8 are subjected to planarization and removed according to CMP (Chemical-Mechanical Polishing) along with the formation of the first conductive semiconductor layer 1 and the dielectric layer 2.

Figure 7E:
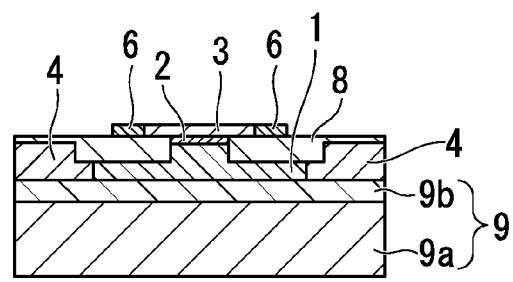
FIG. 7E is a cross-sectional view showing a fifth step of a manufacturing method of a silicon-base electro-optic element.

As shown in FIG. 7E, a polycrystalline semiconductor layer is deposited with a thickness of 0.1 μm to 0.3 μm and then subjected to second-conductive ion injection, thus forming a second conductive semiconductor layer 3. Herein, it is possible to carry out ion injection of impurities during the formation of a polycrystalline semiconductor layer. Additionally, ion injection of impurities is carried out on the opposite ends of the second conductive semiconductor layer 3, thus forming second contacts 6 doped with impurities at a higher density than other parts.

Figure 7F:
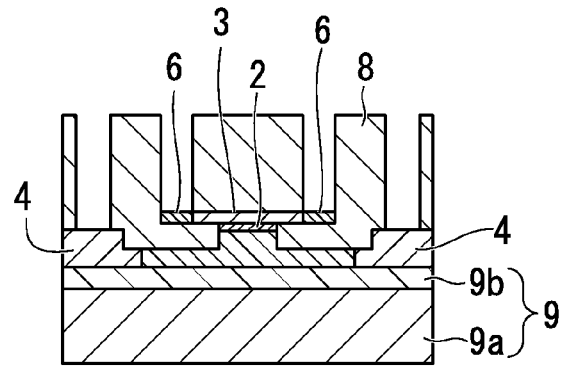
FIG. 7F is a cross-sectional view showing a sixth step of a manufacturing method of a silicon-base electro-optic element.
Figure 7G:
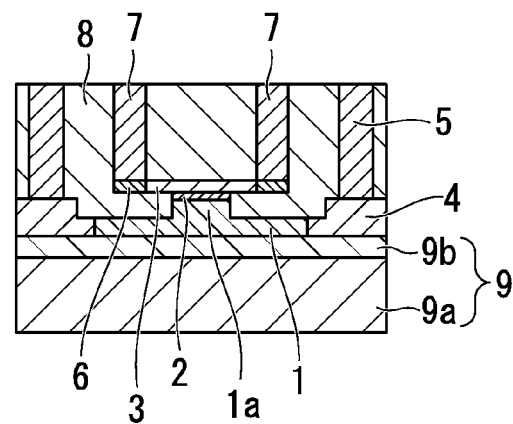
FIG. 7G is a cross-sectional view showing a seventh step of a manufacturing method of a silicon-base electro-optic element.

As shown in FIG. 7F, the oxide film clad layer 8 is deposited again according to plasma CVD. Then, contact holes are formed in the clad layer 8 according to reactive etching. As shown in FIG. 7G, metal layers made of Ti/TiN/Al(Cu) or Ti/TiN/W are formed and embedded in contact holes according to sputtering or CVD. Subsequently, metal layers extending outside contact holes are subjected to patterning according to reactive etching, thus forming first electrode wires 5 and second electrode wires 7. Thus, it is possible to completely produce a silicon-base electro-optic element. Due to the formation of the first electrode wires 5 and the second electrode wires 7, it is possible to establish an electric connection between a silicon-base electro-optic element and a drive circuit.

Figure 8:
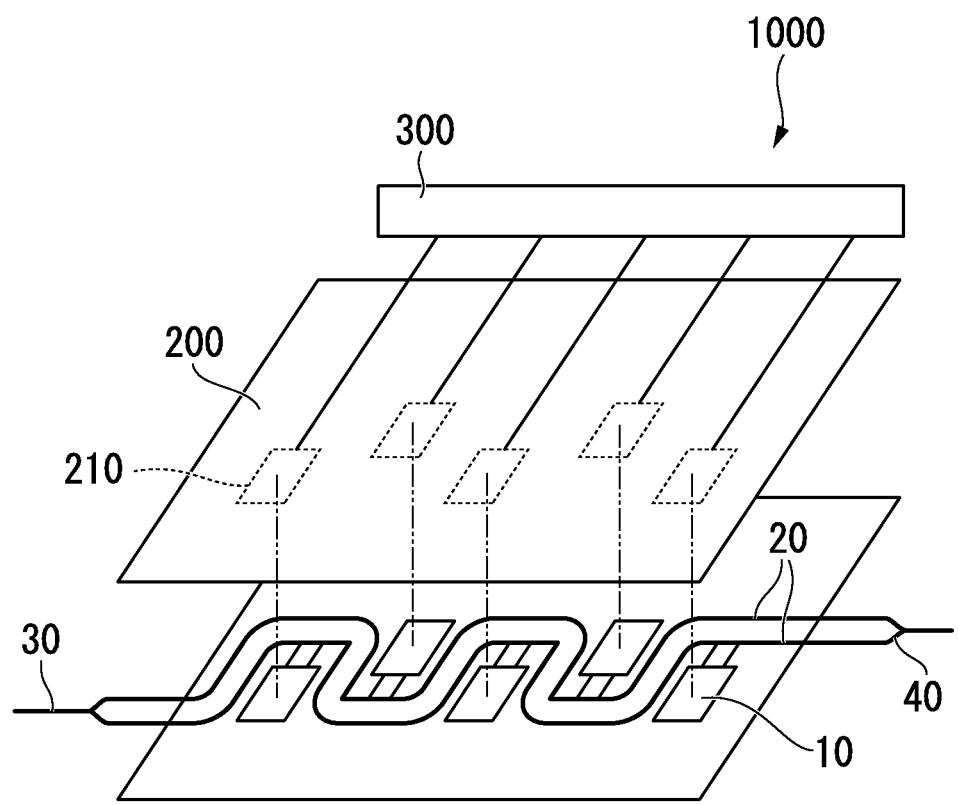
FIG. 8 is a perspective view of an optical modulation device according to one embodiment of the present invention.

FIG. 8 is a perspective view of an optical modulation device 1000 according to one embodiment of the present invention. The optical modulation device 1000 includes a drive circuit 200 connected to the electrode pads 10 of the optical modulator 10, and a power source 300 connected to the drive circuit 200. The electrode pads 10 of the optical modulator 100 are connected to electrode pads 210 of the drive circuit 200. It is preferable that the electrode pads 10 join the electrode pads 210 according to flip-chip bonding.

Figure 9:
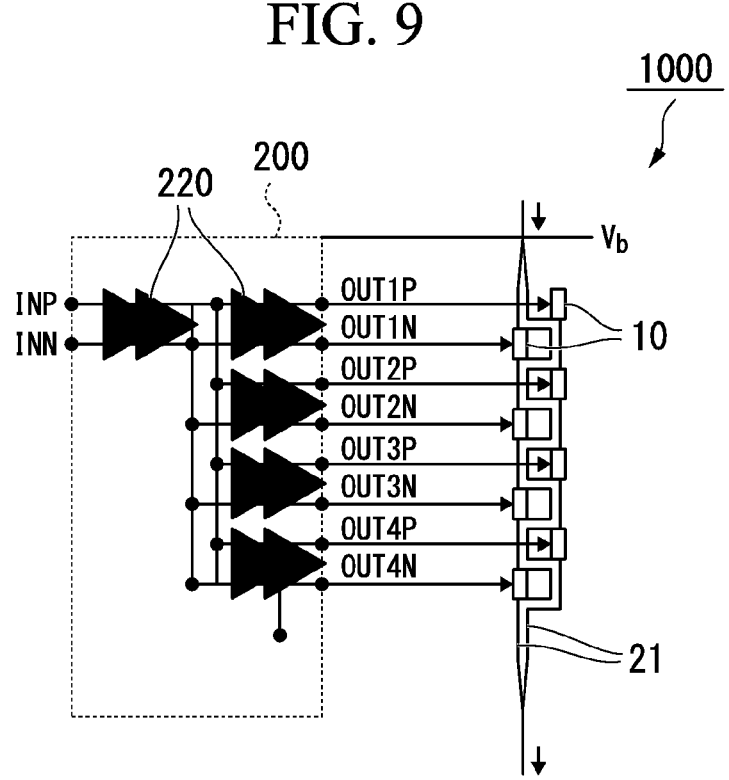
FIG. 9 is a circuit diagram of the optical modulation device including a drive circuit in connection with an optical modulator.

FIG. 9 is a circuit diagram diagrammatically showing the circuitry of the optical modulation device 1000. The circuitry of FIG. 9 further includes signal delays 220 in the drive circuit 200. Input light undergoes phase differences due to voltages applied to the electrode pads 10. The drive circuit 200 controls voltages applied to the electrode pads 10. A bias voltage Vb is applied to the drive circuit 200 to control an operating point of the optical modulator 100. The power source 300 applies voltages INP, INN to the drive circuit 200. Voltages applied to the drive circuit 200 are controlled by the signal delays 220 and then output to OUT1P, OUT1N. The output voltage of OUT1P is applied to one of two arms via the electrode pad 10. The output voltage of OUT1N is applied to the other of two arms via the adjacent electrode pad 10. Input light is changed in an optical phase based on the output voltages of OUT1P, OUT1N. FIG. 9 shows that the output terminals of the drive circuit 200 are divided into four subdivisions, i.e. OUT1P to OUT4P and OUT1N to OUT4N; but this is not a restriction.

It is preferable that the drive circuit 200 include the signal delays 220. Light whose phase is demodulated in a first optical phase modulation region is further modulated in phase in a second optical phase modulation region. In this case, it is difficult to efficiently superpose phase changes due to shifting of electric signals, output from the drive circuit 200, relative to light propagation speed. Shifting of electric signals may cause jitters representing shifting or fluctuations of the output waveform of light on the time axis. Increasing the number of optical phase modulation regions may increase impacts due to shifting of electric signals.

Owing to the signal delays 220 included in the drive circuit 200, it is possible to adjust the speed of electric signals in the drive circuit 200 with the propagation speed of light in the optical modulator 100. That is, it is possible to suppress jitters representing shifting or fluctuations of the output waveform, output from the optical modulator 100, on the time axis.

Figure 10:
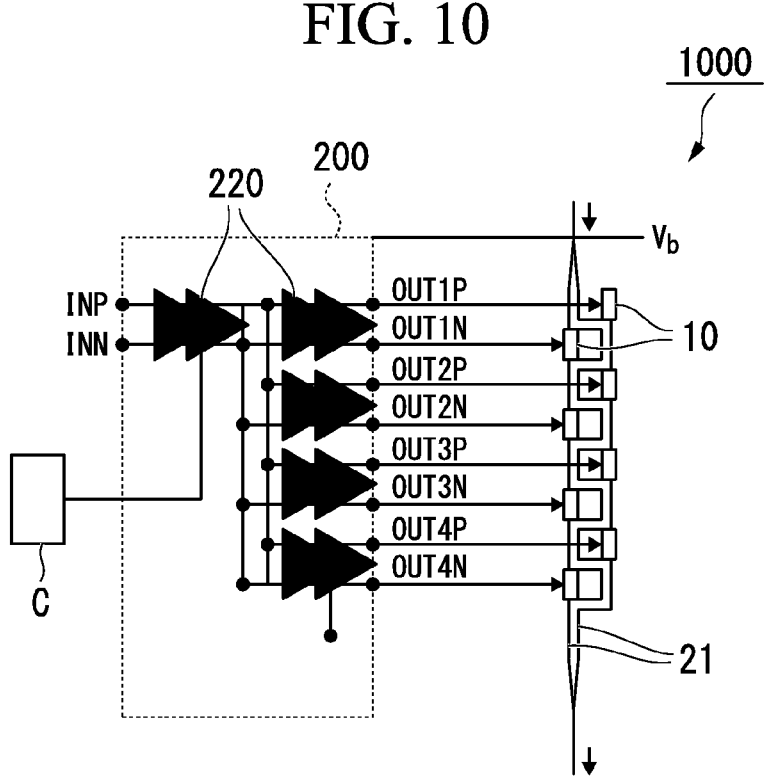
FIG. 10 is a circuit diagram of the optical modulation device further including a clock signal source connected to the drive circuit.
Figure 11:
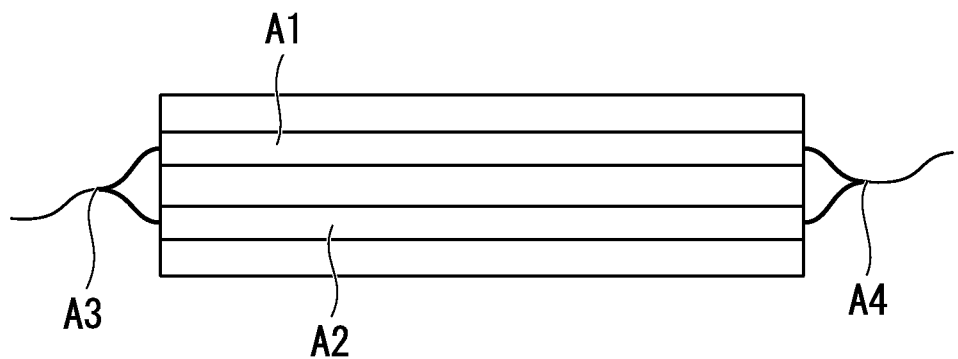
FIG. 11 is a schematic illustration showing an example of an optical modulator using a Mach-Zehnder interferometer.

It is preferable that a clock signal source be connected to the drive circuit 200 so as to supply a clock signal to the signal delays 220. FIG. 10 is a circuit diagram of the optical modulation device 1000 further including a clock signal source C. It is possible to adjust delay times of the signal delays 220 applied to electric signals based on a clock signal of the clock signal source C supplied to the drive circuit 200. Thus, it is possible to adjust the delay times applied to electric signals in conformity with light propagation speed in the optical modulator 100.

It is preferable to adjust the arms between the optical modulation parts subjected to optical phase modulation using a plurality of electrode pads 10 so as to match the speed of electric signals in the drive circuit 200 with the propagation speed of light being guided via the optical modulator 100.

In the above, the drive circuit 200, including the signal delays 220 controlled by a clock signal, is designed to adjust the speed of electric signals in conformity with the propagation speed of optical signals transmitted through the optical modulator 100; but this is not a restriction. It is possible to adjust the speed of electric signals with the propagation speed of light in the optical modulator 100. That is, it is possible to adjust the timing of outputting electric signals from the drive circuit 200 with the propagation speed of light in the optical modulator 100 by changing the propagation speed of light being guided by the optical waveguide or by changing the distance of the optical waveguide. Specifically, it is possible to increase the propagation speed of light being guided by the optical waveguide by increasing the size (or a diameter) of the optical waveguide in the optical modulator 10. In contrast, it is possible to decrease the propagation speed of light being guided by the optical waveguide by decreasing the size (or a diameter) of the optical waveguide. Alternatively, it is possible to increase the time of the guided light to be transmitted between adjacent optical modulation parts by increasing the lengths of the arms between optical modulation parts. In contrast, it is possible to decrease the time of the guided light to be transmitted between adjacent optical modulation parts by decreasing the lengths of the arms between optical modulation parts. That is, it is possible to match the speed of electric signals from the drive circuit 200 with the propagation speed of the guided light in the optical modulator 100 by adjusting the size or lengths of the arms between optical modulation parts subjected to optical phase modulation using a plurality of electrode pads 10. Owing to the foregoing matching between the speed of electric signals and the propagation speed of light, it is possible to suppress jitters representing shifting or fluctuations of the output waveform of an optical modulator on the time axis.

Lastly, the present invention is not necessarily limited to the foregoing embodiments and examples, which can be further modified in various ways within the scope of the invention as defined in the appended claims.

What is claimed is:

1. An optical modulator comprising
   a plurality of electrode pads arranged in a zigzag alignment;
   a pair of arms, each of which is partially bent to circumvent the plurality of electrode pads and each of which carries out optical phase modulation at a plurality of optical modulation parts based on voltages input via the plurality of electrode pads;
   an optical branch structure in which the pair of arms is branched away in a light-input side; and
   an optical coupling structure in which the pair of arms is aggregated together in a light-output side.

2. The optical modulator according to claim 1, wherein the pair of arms is each made of a silicon-base electro-optic element, wherein the silicon-base electro-optic element includes a substrate; a first conductive semiconductor layer which is formed on the substrate with a rib waveguide structure having a rectangular shape projecting oppositely to the substrate; a dielectric layer deposited on the rib waveguide structure; and a second conductive semiconductor layer deposited on the dielectric layer,
   wherein the first conductive semiconductor layer is connected to a first electrode wire via a first contact doped with first conductive impurities at a higher density than other parts,
   wherein the second conductive semiconductor layer is connected to a second electrode wire via a second contact doped with second conductive impurities at a higher density than other parts, and
   wherein the first contact has a rectangular shape projecting above a slab of the first conductive semiconductor layer.

3. The optical modulator according to claim 2, wherein the first contact is continuously formed in an optical waveguide direction, and wherein the second conductive semiconductor layer is divided into subdivisions in the optical waveguide direction.

4. The optical modulator according to claim 2, wherein the first contact and the second conductive semiconductor layer are each divided into subdivisions in an optical waveguide direction.

5. The optical modulator according to claim 2, wherein the pair of arms is positioned adjacent to each other, and wherein the pair of arms are both made of silicon-base electro-optic elements formed on the substrate, and wherein the pair of arms shares the first contact and the first electrode wire at adjacent faces thereof.

6. An optical modulation device comprising:
   an optical modulator as defined in claim 1;
   a drive circuit connected to the plurality of electrode pads included in the optical modulator; and
   a power source connected to the drive circuit.

7. The optical modulation device according to claim 6, wherein the drive circuit includes a plurality of signal delays in connection with the plurality of electrode pads.

8. The optical modulation device according to claim 7, further comprising a clock signal source connected to the drive circuit, wherein the clock signal source supplies a clock signal to each of the plurality of signal delays.

9. The optical modulation device according to claim 6, wherein the pair of arms between the plurality of optical modulation parts subjected to optical phase modulation via the plurality of electrode pads is each adjusted to match speed of an electric signal from the drive circuit with propagation speed of light being guided inside the optical modulator.

* * * * *